(12) United States Patent
Guzman et al.

(10) Patent No.: US 7,094,334 B1
(45) Date of Patent: Aug. 22, 2006

(54) WATER FILTER HAVING A FILTER USE TIME INDICATOR

(75) Inventors: Guillermo Guzman, Lighthouse Point, FL (US); Keith Worboys, Pompano Beach, FL (US)

(73) Assignee: H2O International Inc., Deerfield Beach, FL (US)

( * ) Notice: Subject to any disclaimer, the term of this patent is extended or adjusted under 35 U.S.C. 154(b) by 371 days.

(21) Appl. No.: 10/731,787

(22) Filed: Dec. 9, 2003

Related U.S. Application Data

(60) Provisional application No. 60/472,338, filed on May 21, 2003.

(51) Int. Cl.
*B01D 35/04* (2006.01)
*B01D 35/143* (2006.01)

(52) U.S. Cl. .................. 210/87; 210/138; 210/123; 210/449; 200/84 C; 340/623

(58) Field of Classification Search ............... 210/460, 210/449, 138, 87, 282, 90, 123, 86; 340/623, 340/609; 200/81.9 M, 81.9 R, 84 R, 84 C
See application file for complete search history.

(56) References Cited

U.S. PATENT DOCUMENTS

| | | | | |
|---|---|---|---|---|
| 2,388,671 A | * | 11/1945 | Brewer | .................. 200/81.9 R |
| 3,372,255 A | * | 3/1968 | Allen et al. | ............ 200/81.9 R |
| D277,305 S | | 1/1985 | Grube | ....................... D23/209 |
| D285,958 S | | 9/1986 | Koizumi et al. | ........... D23/209 |
| 4,623,451 A | | 11/1986 | Oliver | .......................... 210/87 |
| 4,686,037 A | | 8/1987 | Lang | ....................... 210/221.2 |
| 4,839,039 A | | 6/1989 | Parsons et al. | ............. 210/143 |
| 4,885,081 A | | 12/1989 | Oliver | .......................... 210/87 |
| D328,942 S | | 8/1992 | Igami et al. | ............... D23/209 |
| D358,868 S | | 5/1995 | Hembree et al. | .......... D23/209 |
| 5,833,849 A | | 11/1998 | Primdahl | .................... 210/232 |
| 5,853,572 A | | 12/1998 | Kuennen et al. | .............. 210/87 |
| 5,888,381 A | * | 3/1999 | Primdahl et al. | ............. 210/87 |
| 5,925,172 A | | 7/1999 | Rick et al. | ..................... 96/397 |
| 5,935,426 A | | 8/1999 | Giordano et al. | ............. 210/87 |
| 6,251,274 B1 | | 6/2001 | Shepherd | .................... 210/235 |
| D457,596 S | | 5/2002 | Guzman et al. | ........... D23/209 |
| 2004/0069696 A1 | * | 4/2004 | Warren et al. | ................ 210/97 |

* cited by examiner

*Primary Examiner*—Terry K. Cecil
(74) *Attorney, Agent, or Firm*—Standley Law Group LLP

(57) ABSTRACT

The described embodiments of the present invention include a water filter having a float portion with a magnet that moves up and down due to water flow to activate a switch for tracking the use time of the filter.

6 Claims, 3 Drawing Sheets

FLOW POSITION — NO-FLOW POSITION

WATER FILTER HAVING A FILTER USE TIME INDICATOR

This application claims the benefit of U.S. Provisional Application No. 60/472,338, filed May 21, 2003, which is incorporated herein by reference.

FIELD OF THE INVENTION

The present invention relates to the field of water filters.

BACKGROUND OF THE INVENTION

Water filters have become increasingly prevalent as consumers have become more health conscious. Typically, these water filters attach directly to the water faucet outlet and filter water as it flows out of the faucet. Generally, these water filters are comprised of filter cartridges that must be replaced after a certain period of time or use.

Accordingly, there have been prior filters designed to detect the amount of flow through the filter and to alert the user when the filter needs to be replaced. For example, U.S. Pat. No. 5,935,426 to Giordano et al. teaches a water filter having a flow detection means. The Giordano patent also describes the use of a red, yellow, green LED configuration to alert the user of the status of the water filter.

The present invention relates to a new and improved water filter for detecting flow through the filter and for alerting the user of the status of the filter.

SUMMARY OF THE INVENTION

The present invention relates to a water filter, comprising: a first opening for connecting to a faucet; a cartridge having filter media; a float portion residing on top of the cartridge, the float portion adapted to move up off the cartridge during water flow; a magnet on the float portion; a switch in communication with the magnet, wherein the magnet activates the switch during water flow; a processor electrically connected to the switch wherein the processor tracks the time water flows through the filter; wherein the float portion returns to the top of the cartridge when water is not flowing through the filter.

DETAILED DESCRIPTION OF THE PREFERRED EMBODIMENT

Figure 1:
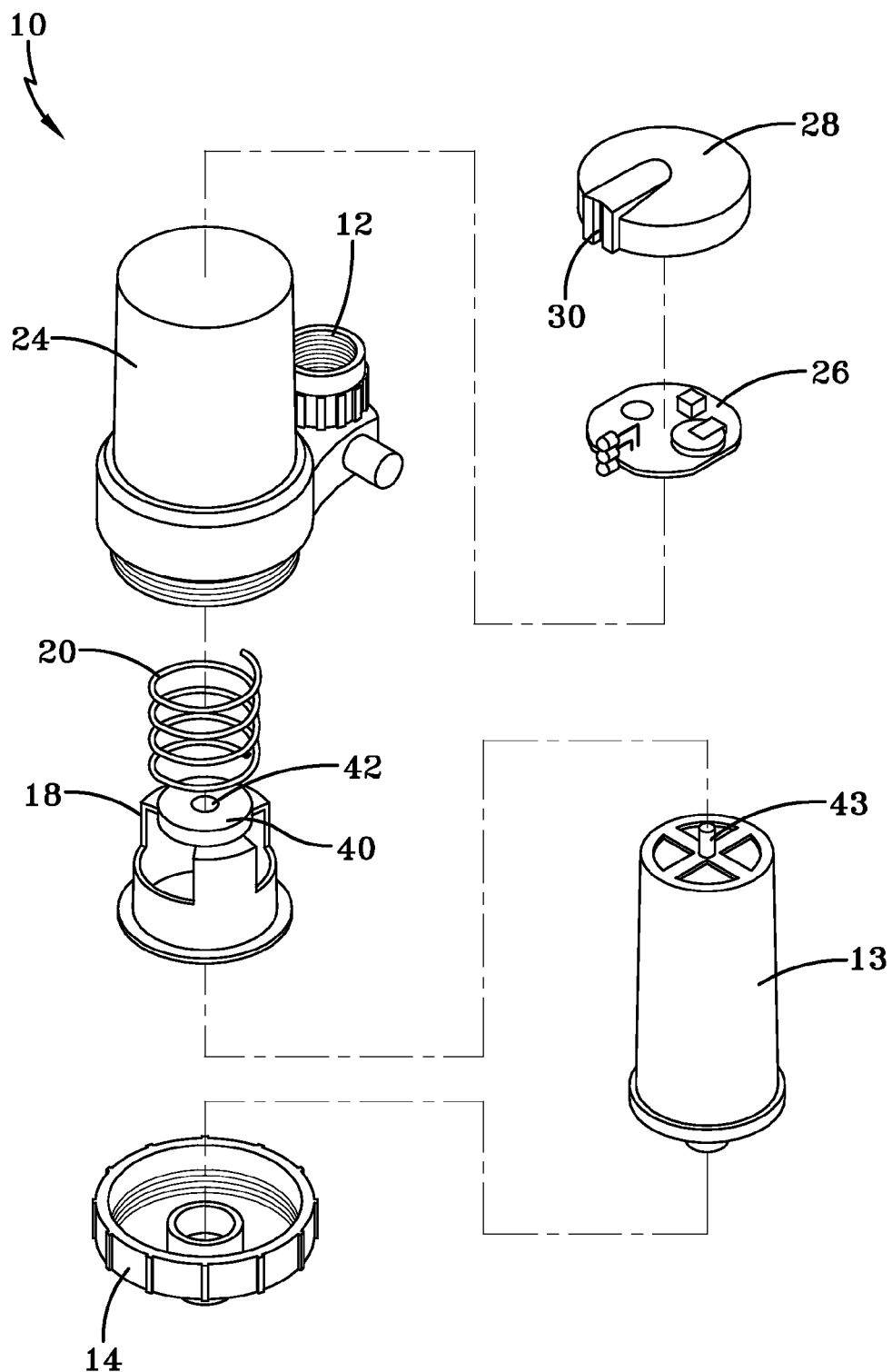
FIG. 1 illustrates an exploded view of one example embodiment of a water filter of the present invention.

FIG. 1 illustrates an exploded view of one example embodiment of a water filter 10 of the present invention. The water filter attaches to the water faucet at 12. The filter may be used on any type of water faucet, including shower faucets or drinking water faucets. The water enters the filter through the faucet and is filtered by the filter media contained in the filter. The water filter is preferably comprised of a replacable cartridge 13 that houses the filter media. The filtered water then exits the filter at the filter outlet 14. The LED display 16 alerts the user as to the status of the filter.

In the preferred embodiment, the water filter of the present invention is comprised of a float device 18 that is adapted to ride over the cartridge. A spring 20 and magnet 22 are placed on top of the float. The body portion 24 is then placed over the float and cartridge assembly. A circuit board 26 containing the electronics for the water filter is then placed on top of the filter body. A filter cover 28 is then placed over the circuit board. The filter cover is preferably comprised of a LED viewing area 30 for allowing the light from the LED assembly to shine through.

Figure 2:
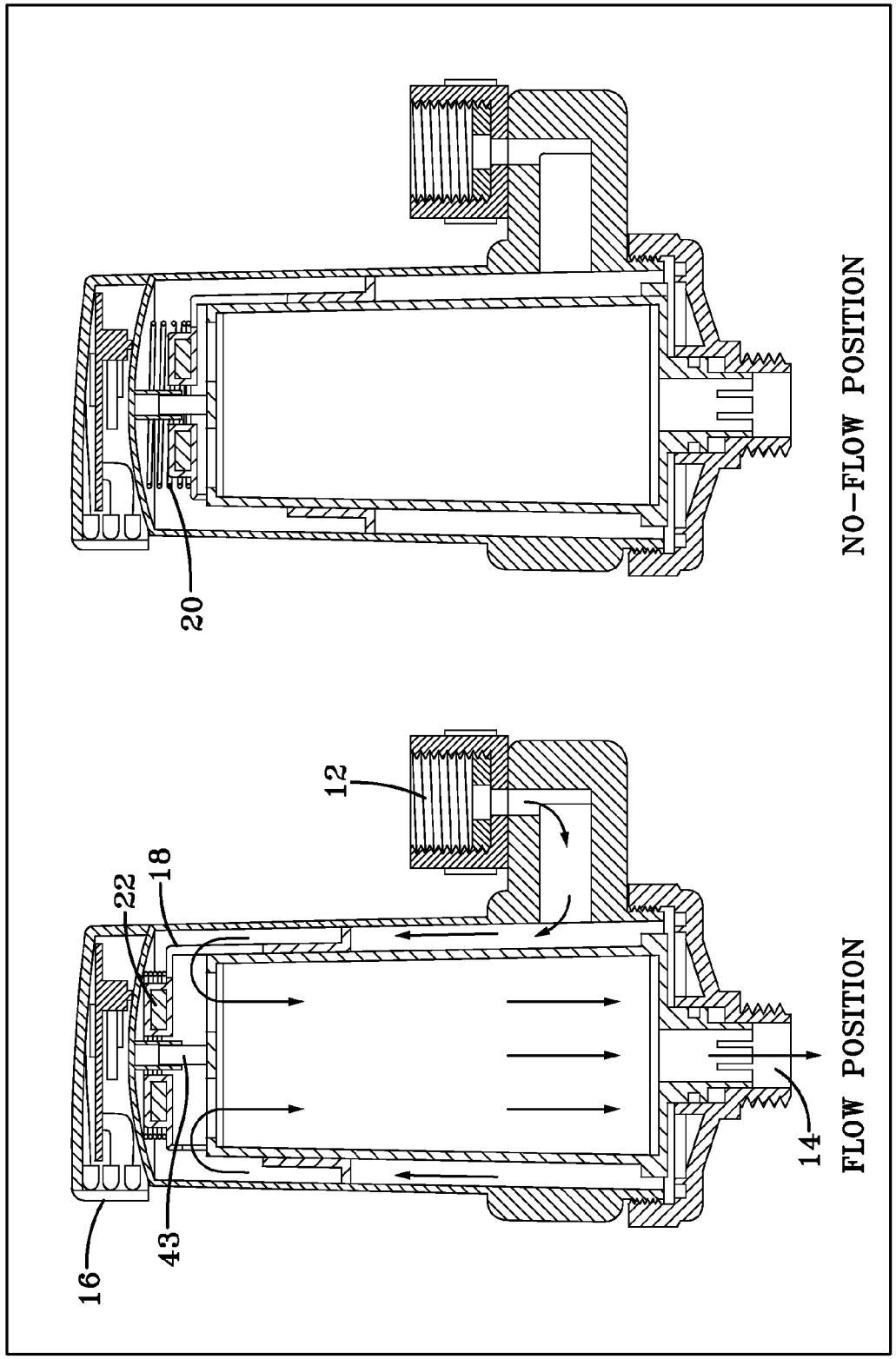
FIG. 2 illustrates one example cross-sectional view of the water filter of the present invention.

FIG. 2 illustrates one example cross-sectional view of the water filter of the present invention. The arrows in the figure illustrate the flow of water through the filter. When the water is off ("No-Flow" position), the float is down and sits on top of the cartridge. As water flows through the filter ("Flow" position), the float is pushed upwards where the magnetic piece (preferably, within it) activates the switch and the light starts blinking green (assuming the filter is still in the "good" or useable state). At this time the electronics of the filter starts measuring the time water is flowing through the device and this process will stop when water stops flowing (float will return to its original position and the switch will be deactivated). A spring assists in pushing the float portion down to its original position after the water flow has stopped. When the water is off, the float portion is in the lower position and the circuit is idle. In other words, the Reed switch 34 is de-activated, and the time counting function stops.

As the water is flowing through the filter, the float is up and the spring is compressed and thus not noticeable on the drawing. The water fills up the housing (between the cartridge outside wall and the body inner wall) while pushing the float portion up and holding it up while water is still flowing. Once the housing is full of water the water has to run out and it can only go out one way: it enters the cartridge at the top and runs down through the media and out to the outlet where a shower head will be attached.

In one example embodiment, during periods of flow, the green LED flashes. The green LED will blink for 3200 minutes of flow time after which the yellow LED will blink for 800 minutes of flow time. After 4,000 minutes of flow, the red LED will blink. The green LED indicates the filter cartridge is still in the "good" or useable state. The yellow LED indicates that the filter cartridge is close to its depleted state. The red LED indicates that the filter cartridge should be replaced with a new cartridge.

The capacity of the example system is set at 10,000 assuming that the water flows at 2.5 gallons per minute which is the maximum, per code, flow through a standard shower head.

Figure 3:
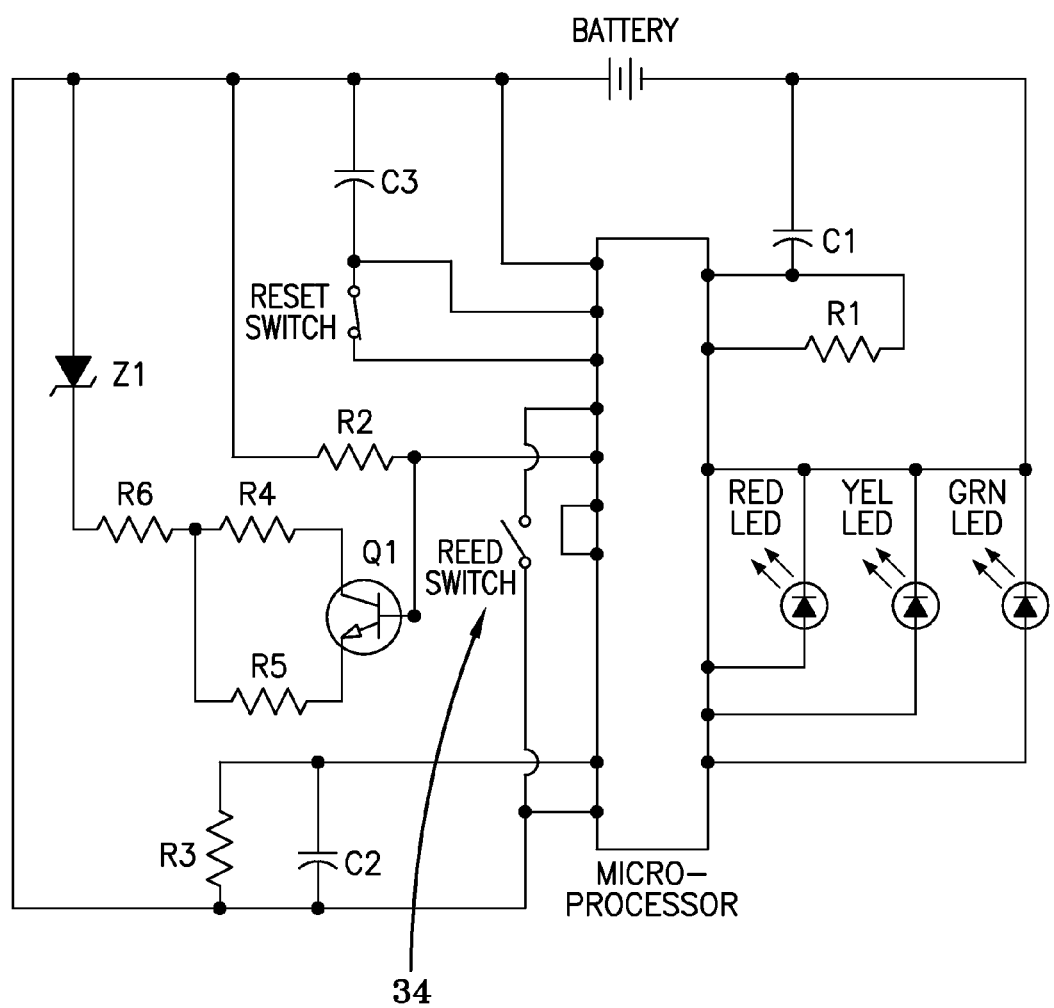
FIG. 3 illustrates one example circuit diagram of the water filter of the present invention.

FIG. 3 illustrates one example circuit diagram of the water filter of the present invention. As discussed, when the water flow begins, the the float portion is pushed upwards by the water stream. The magnet enclosed within the float portion moves into proximity to the switch, preferably a Reed switch, mounted to the printed circuit board. This activates the switch, closing the electrical circuit, and beginning the counting of elapsed flow time. Battery power is provided to the microprocessor which then counts time. The duration of elapsed time determines which LED is lit. Various known microprocessors with timing and counting functionality can be used to track the time of water flow for the filter. The microprocessor is programmed to activate the appropriate LED in accordance with the predetermined set times of the present invention.

When the filter cartridge is changed, the reset button on the circuit board must be pressed to initiate a new timing cycle. Alternately, replacing the battery will initiate a new timing cycle.

In the preferred embodiment, the magnet is enclosed and completely sealed by ultrasonic weld to avoid any exposure to air or water. Enclosing the magnet in this fashion prevents corrosion of the magnet. In the example embodiment, the magnet housing 40 is adapted with a center hole 42 that engages a protrusion 43 from the cartridge. The center hole of the magnet housing rides along the protrusion as the float portion moves up and down due to the water flow.

In the preferred embodiment, the float portion's center hole is large enough in diameter in order to fit around the center piece of the body and allow enough travel distance to activate and deactivate the magnet with certainty.

Although the present invention has been described with regard to several embodiments, those embodiments are not to be construed as limiting the scope of the invention. Many embodiments of the invention will become apparent to those skilled in the art in light of the teachings of this specification. The only limitation of the scope of the invention are the claims appended hereto and equivalents thereof.

We claim:

1. A water filter, comprising:
   a first opening for connecting to a faucet;
   a cartridge having filter media;
   a float portion residing on top of said cartridge, said float portion adapted to move up off the cartridge during water flow;
   a magnet on said float portion;
   a switch in communication with said magnet, wherein said magnet activates said switch during water flow;
   a processor electrically connected to said switch wherein said processor tracks the time water flows through the filter;
   wherein said float portion returns to the top of said cartridge when water is not flowing through said filter;
   a body portion for enclosing said cartridge;
   a space interposed between said body portion and said cartridge;
   wherein said float portion is adapted to reside in a portion of said space so that when water flows into said filter, water fills said space moving said float portion off said cartridge allowing water to flow into said cartridge.

2. A water filter according to claim 1, further comprising:
   a group of LEDs for indicating the status of the filter.

3. A water filter according to claim 2, wherein said group of LEDs is further comprised of:
   a green LED;
   a yellow LED; and
   a red LED.

4. A water filter according to claim 1, wherein said cartridge is comprised of openings in the top of said cartridge for allowing water to enter said cartridge; and
   wherein said cartridge has openings in the bottom of said cartridge for allowing water to leave said cartridge after being filtered by said filter media.

5. A water filter according to claim 1, further comprising:
   a spring operably connected to a top portion of said float portion for pushing said float portion back to the top of said cartridge when water flow stops.

6. A water filter, comprising:
   a cartridge having filter media;
   a float portion residing on top of said cartridge, said float portion adapted to move up off the cartridge during water flow;
   a magnet on said float portion;
   a switch in communication with said magnet, wherein said magnet activates said switch during water flow;
   a processor electrically connected to said switch wherein said processor tracks the time water flows through the filter;
   wherein said float portion returns to the top of said cartridge when water is not flowing through said filter;
   a group of LEDs for indicating the status of the filter;
   a body portion for enclosing said cartridge;
   a space interposed between said body portion and said cartridge;
   wherein said float is portion adapted to reside in a portion of said space so that when water flows into said filter, water fills said space moving said float portion off said cartridge allowing water to flow into said cartridge.

* * * * *